United States Patent [19]

Chan

[11] Patent Number: 4,861,971
[45] Date of Patent: Aug. 29, 1989

[54] PARKING METERS CAPABLE OF BEING OPERATED WITHOUT MONETARY COINS

[76] Inventor: Mike T. Chan, 308 Midvalley Pl. SE., Calgary, Alberta, Canada, T2X 1M5

[21] Appl. No.: 97,753

[22] Filed: Sep. 17, 1987

[30] Foreign Application Priority Data

Aug. 10, 1987 [CA] Canada ................................. 544106

[51] Int. Cl.$^4$ ............................................. G07B 15/02
[52] U.S. Cl. .................... 235/384; 235/381; 235/449; 368/90; 364/467
[58] Field of Search .................. 235/384, 381; 368/90; 364/467

[56] References Cited

U.S. PATENT DOCUMENTS

| 4,379,334 | 4/1983 | Feagins et al. ........................ 364/467 |
| 4,518,852 | 5/1985 | Stockburger et al. ............... 235/381 |
| 4,717,815 | 1/1988 | Tomer ............................. 235/384 X |
| 4,730,285 | 3/1988 | Lie ........................................ 368/90 |

FOREIGN PATENT DOCUMENTS

| 848299 | 8/1970 | Canada . |
| 1049656 | 2/1979 | Canada . |
| 1085958 | 9/1980 | Canada . |
| 0034570 | 8/1981 | European Pat. Off. . |
| 0176465 | 4/1986 | European Pat. Off. . |
| 0206884 | 12/1986 | European Pat. Off. . |
| 2041611 | 9/1980 | United Kingdom . |

OTHER PUBLICATIONS

PCT application WO 86/02187, published Apr. 10, 1986.

Primary Examiner—David L. Trafton

[57] ABSTRACT

A parking meter capable of being operated without the use of a monetary coin. The parking meter is intended to be used with an account card incorporating a read/-write memory (e.g. a magnetic strip) pre-recorded with a monetary value. The parking meter has a body with a slot or the like for receiving the account card, means for reading the memory on the card, a comparator for comparing information from the memory with stored information, a timer for measuring a predetermined time period, an indicator for indicating the elapse of the time period, a start mechanism for the timer having an enabling or disabling control governed by the comparator and an amending device for amending the memory on the account card to deduct the value of the parking period bought by the user.

7 Claims, 3 Drawing Sheets

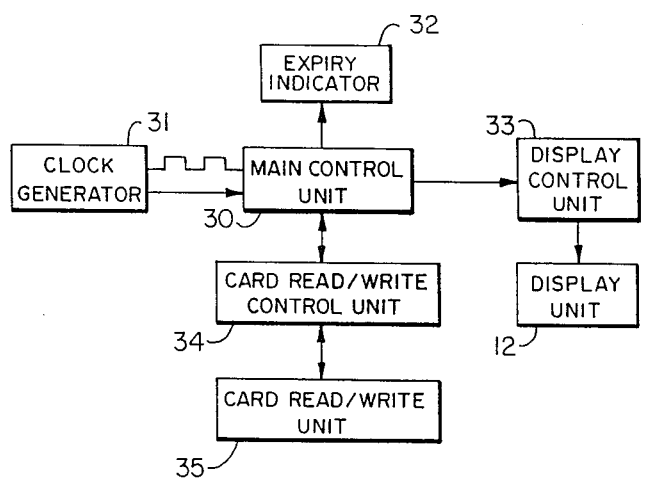
FIG. 4
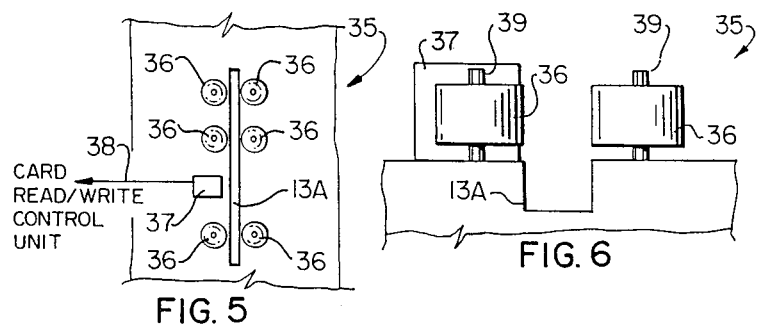
FIG. 5
FIG. 6
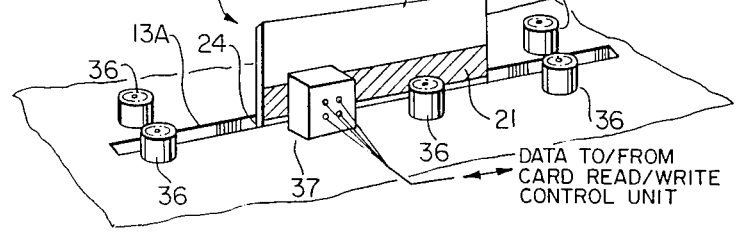
FIG. 7

PARKING METERS CAPABLE OF BEING OPERATED WITHOUT MONETARY COINS

BACKGROUND OF THE INVENTION

1. Field of the Invention

This invention relates to parking meters and, more particularly to parking meters capable of being operated without monetary coins

2. Discussion of the Prior Art

Parking meters are generally operated by the insertion of a monetary coin which buys the user the right to park a vehicle in an assigned place for a specified time period. Parking meters of this kind are, however, inconvenient to use and operate. The user must carry the correct type and number of coins and the operator must provide for frequent emptying of the meters. Moreover, the coin operated meters tend to be unreliable because coins may become jammed in the feed path and because the meters are sometimes damaged in attempts to steal the coins contained in them or to obtain free parking time. The collection and counting of small denomination coins also gives rise to accounting problems.

It has been suggested that credit cards might be used to operate parking meters instead of monetary coins but this has proven to be impractical because very sophisticated (and consequently expensive) equipment is required to read and validate different types of credit cards and to reject valid but stolen cards. Moreover, expensive accounting systems are required to handle the receivables from credit card companies, and credit card companies also charge a fee for each transaction.

Consequently there is a need for parking meters that can be operated without the use of monetary coins but which are nevertheless simple to use and operate and difficult for dishonest users to defeat.

SUMMARY OF THE INVENTION

An object of the invention is to provide parking meters of this type.

According to the invention, there is provided a parking meter capable of being operated without the use of a monetary coin, comprising: a body having means for receiving a user's account card incorporating a read/write memory for recording a discrete monetary value; a timer for measuring a predetermined time period; an indicator for indicating an elapse of said predetermined time period; means for reading said read/write memory of said card; programmable means for comparing information read from said read/write memory with stored information, for commencing measurement of said predetermined time period in accordance with a program and for calculating a monetary charge for said time period; and means for amending said read/write memory to record a deduction of said monetary charge from said monetary value.

Advantages of the present invention, at least in the preferred forms, include the following. The use of stored value account cards means that the operator is pre-paid by the users, and hence payment is received more quickly and conveniently. Rate changes can be handled without physical changes to the meter or to the user's account cards, and increases do not have to correspond to the amounts of convenient monetary coins. Meter emptying is eliminated and accounting is greatly simplified.

BRIEF DESCRIPTION OF THE DRAWINGS

FIG. 4 is a block diagram showing the arrangement of the internal meter components;

FIG. 5 is a top plan view of the card read/write unit used in the meter;

FIG. 6 is a transverse cross-section of the unit of FIG. 5;

FIG. 7 is a perspective view of the units of FIG. 5 and 6 additionally showing an account card;

DETAILED DESCRIPTION OF THE PREFERRED EMBODIMENTS

Figure 1:
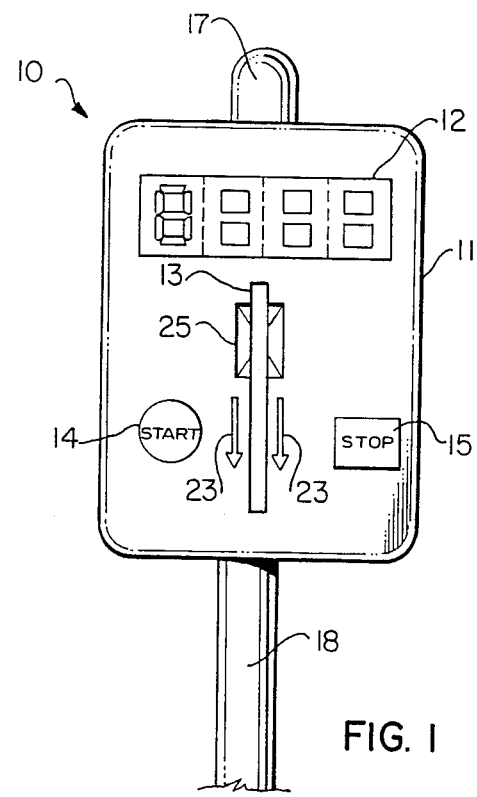
FIG. 1 is a front view of a parking meter according to a preferred embodiment of the present invention.

A parking meter 10 according to a preferred embodiment of the invention is shown in FIG. 1. The parking meter has a body 11 of generally rectangular shape provided with a front face having a numerical or alpha-numerical display 12 (which may be, for example, of the light-emitting diode or liquid crystal type), a vertical card slot 13, a start button 14 and a stop button 15. The top surface of the body is provided with a time-expiring warning lamp 17 and the body is mounted on a suitable post 18.

Figure 2:
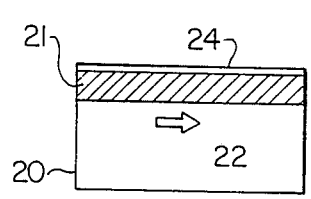
FIG. 2 shows an account card for use with the parking meter of FIG. 1.

The parking meter is designed to be operated by an account card such as the one indicated by the numeral 20 and shown in FIG. 2. The card may be made of plastic, paper board or other suitable material and has a magnetic strip 21 on one side near an edge 24 to be inserted into the slot. An arrow 22 is printed on the card below the strip 21 to show the direction in which the card should be moved through the slot 13. Arrows 23 are also provided on the meter body 11 for the same purpose.

Figure 3:
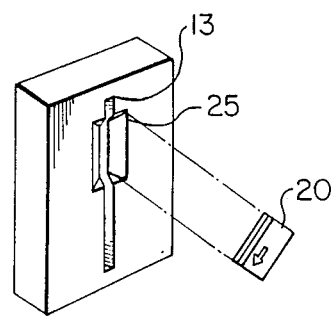
FIG. 3 is a close-up perspective view of the slot area of the meter shown in FIG. 1.

The card slot 13 is shown in a perspective view from one side in FIG. 3. From this it will be seen that the body of the meter has a shallow rectangular depression 25 straddling the slot 13 adjacent to its upper end. This depression facilitates insertion of the card 20 into the slot because space is provided on each side of the slot for the user's finger. The depression also clearly identifies the position where the card should first be inserted. The slot 13 is quite shallow so that the edge of the card 20 opposite the inserted edge 24 always projects from the slot even when it is moved along the slot out of the depression 25. This enables the user to move the card down the slot to the bottom and then back up to the depression 25 where it can easily be withdrawn from the slot.

FIGS. 4 to 10 show the internal components of the parking meter 10 and how they are interconnected.

First of all, a block circuit diagram of the main internal components is shown in FIG. 4. A main control unit 30 is preferably a microprocesor normally having at least 4K of memory loaded with a pre-set program. The microprocessor is connected to a clock generator 31. The main control unit 30 governs the operation of a time expiry indicator 32 (which includes lamp 17), and a display control unit 33 which in turn controls the display 12. The main control unit 30 exchanges information with and controls a card read/write control unit 34 which in turn controls a card read/write unit 35.

The card read/write unit 35 is shown in plan view in FIG. 5, in transverse cross-section in FIG. 6 and in perspective view in FIG. 7. The unit 35 is located directly below slot 13 and includes a slot extension 13A for receiving the projecting edge 24 of card 20, upright cylindrical rollers 36 arranged in pairs on opposite sides of the slot extension 13A and a read/record head 37 located on one side of the slot extension in a position to contact the magnetic strip 21 of an inserted account card 20 (FIG. 7). The read/record head 37 is connected via cable 38 to the read/write control unit 34.

The rollers 36 are preferably made of rubber or similar elastic material and are mounted for rotation on posts 39. The rollers of each pair are close enough together to grip card 20 as it is moved along the slot and limit the speed with which the card can be moved past the read/record head 37 so that information can properly be read from the magnetic strip 21.

Figure 8:
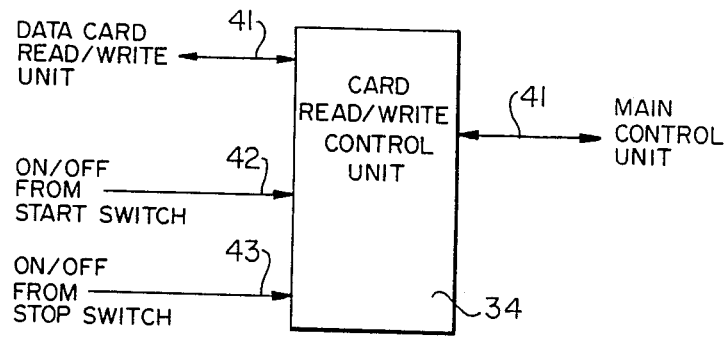
FIG. 8 shows the connections to the card read/write control unit.

The card read/write control unit 34 is shown in block diagram form in FIG. 8. The unit conveys data between the magnetic strip 21 on the account card and the main control unit via links 40 and 41, respectively. The unit also receives on/off signals from start button 14 and stop button 15 via links 42 and 43, respectively, and these are conveyed to the main control unit which may or may not act on these inputs according to the main control unit program.

Figure 9:
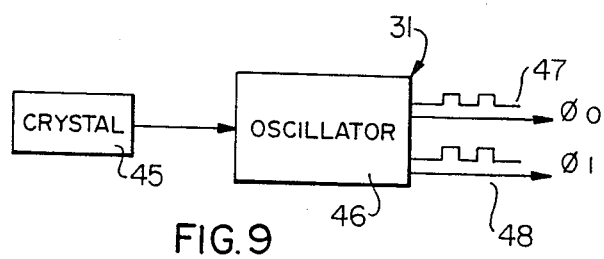
FIG. 9 shows the components of the clock operator used in the meter.
Figure 10:
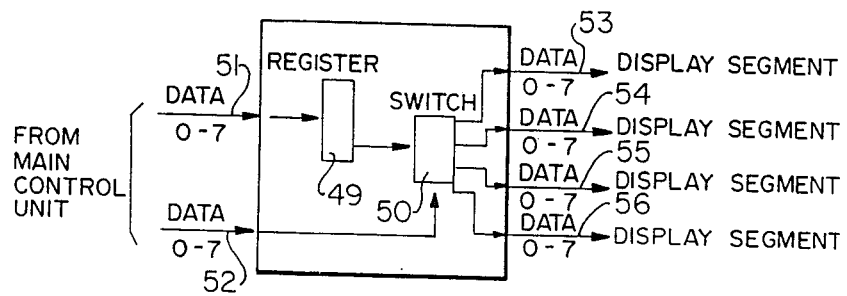
FIG. 10 shows the components and connections of the display control unit used in the meter.

The clock generator 31 is shown in block diagram form in FIG. 9 and consists of a crystal unit 45 linked to an oscillator 46 which produces outputs 47 and 48. The clock generator acts as the timer for timing the predetermined parking periods.

The display control unit 33 may be a conventional unit available commercially. A unit suitable for a four-numeral display is shown in block diagram form in FIG. 10. The unit comprises a register 49 and a switch 50. The unit receives signals from the main control unit via links 51 and 52 and delivers individual outputs 53, 54, 55 and 56 for the various display segments The parking meter described above is intended to be used as follows.

When the user wishes to start the meter after parking a vehicle, the start button 14 is pressed. The main control unit 30 causes the display unit 12 to display "0000" indicating that the meter is ready for input. The user then inserts the pre-purchased account card 20 into the slot 13 in the region of depression 25 with the edge 24 foremost and the magnetic strip 21 on the correct side (e.g. as indicated by diagram on the meter body). The card is then moved down the slot in the direction of the arrows 23. The card passes between the rollers 36 and the magnetic strip passes read/record head 37. The information from the card is transferred to the main control unit via the card read/write control unit 34. After reading the time (and optionally the date) from the clock generator 31, and checking the balance and possibly a card identifying code from the account card, the program determines whether the meter should be started. Starting the meter may be rejected for various reasons; for example, the program may show that the meter has entered a no charge period or a no parking period or that there is zero (or insufficient) balance on the card, etc. If the meter is not started as a result of program rejection or because of failure to insert a valid card within a predetermined time period, the main control unit resets the meter to its condition prior to operation of the start button.

If the program determines that it is appropriate to start the meter, the program determines the maximum chargeable time and the applicable rate and calculates a maximum chargeable amount. The maximum chargeable amount is compared with the balance on the card and the lesser of these two figures is used as the actual amount charged. The program then uses the actual amount charged to calculate the time paid for and the time of expiry. If desired, the program can be designed to display the new balance on the card in the display unit 12.

As the user slides the card back from the bottom of the slot to the area of the depression 25, the program directs the card read/write unit 35 to record an identifying code for the meter on the magnetic strip 21 and to amend the recorded monetary value to show the new balance The time of expiry of the parking period may also optionally be recorded At the same time, the lamp 14 is turned off by signals from the main control unit 30 to show that the meter has been properly operated. When the card is removed from the meter, the main control unit causes the display unit 12 to display the parking time in hours/minutes. The display may also continually show the countdown of the time towards the expiry time as time elapses.

If the user wishes to extend the parking period before the meter expires (and assuming that it is the desire of the operator that this be possible), the main control unit may extend the time if the above operation is repeated. The pre-set program will detect the time remaining and take the same into account in its calculations. However, the amount charged written back on the card will be the additional amount charged only and will not include the value of the time remaining prior to this operation. This will ensure that no refund will be bigger than the amount charged on the last operation and on the same card.

If the time expires, the central control unit turns on lamp 17 to indicate a violation (if a vehicle is still parked in the designated place).

If the vehicle is to be removed before the purchased time period has expired, the user may leave with or without stopping the meter. If the meter is not stopped, the user will forfeit the unexpired time. However, the user can obtain a credit for the unexpired time by the following procedure. The stop button 15 is pressed and the card is inserted into the slot and moved down in the manner indicated above. The information on the card is again transferred to the main control unit 30 and the meter code previously recorded on the magnetic strip is checked to ensure that the refund, if any, only goes back to the card it was originally charged to. The program then uses the expiry time and the appropriate rate to calculate a refund amount. This calculated amount is compared with the amount originally charged and the lesser of the two is used as the actual refund amount for the calculation of the new balance for the card. The amount charged and expiry time are then set to zero to avoid double refunds. The main control unit displays the new balance on the display unit 12 and, as the user slides the card back along the slot, the new balance is recorded on the magnetic strip 21 by the read/write unit 35. As the card is removed from the meter, the lamp 14 is turned on and the meter is re-set for future use.

It is contemplated that an account card will remain valid as long as the recorded balance remains above zero and, if desirable, a single card could be used indefinitely if the user paid for additional monetary units to be recorded on the card.

If an error occurs in the stopping procedure or if the user fails to insert the card into the meter within a predetermined period of time, the meter will revert to the state immediately before the stop button 15 was pressed.

The program may cause a predetermined minimum charge to be applied if the meter is stopped immediately after it is started in order to minimize abuse of the meter.

The meter may be programmed to flash a symbol such as "----" in the display 12 to indicate periods of no parking.

The main control unit may also be programmed with an internal calendar to indicate free parking periods, times or dates when parking rates are to be increased, no parking periods and the like.

Instead of using a microprocessor within the meter, several meters could each be connected to a single centralized computer by electrical wires or fibre optics so that data comparison could take place there.

The account card may have a read/write memory provided by means other than a magnetic strip 21, e.g. an embedded microchip, and may be in a shape other than a flat rectangle, as desired.

Furthermore, the card operated system described above could be used in conjunction with a conventional coin-operated mechanism in a single meter body to give the user the option of coin or card operation. For the same purpose, it is possible to design the card-operated mechanism as an add-on conversion unit for attachment to a conventional parking meter.

The device of the invention may also be modified as a stand alone timing meter with multiple card reader/encoders, one for each entrance and exit, for handling a parking lot rather than a single parking space.

Although preferred forms of the invention have been indicated above, it will be apparent to persons skilled in the art that variations and modifications are possible. All such variations and modifications form part of this invention as defined by the following claims.

I claim:

1. A parking meter capable of being operated without the use of a monetary coin for the purchase of a parking period, comprising:
    a body having means for receiving a user's account card incorporating a read/write memory for recording an identity code and a discrete monetary value;
    a timer for measuring an elapse of time;
    an indicator for indicating a termination of said parking period;
    means for reading said read/write memory of said card;
    means for amending said read/write memory of said card; and
    programmable means capable of carrying out the following steps:
    (a) receiving information read from said user's account card, memorizing said identity code and said discrete monetary value, confirming the validity of said account card and issuing a reject signal if said card is invalid;
    (b) noting the time of day and date and comparing same with a memorized list of parking payment rates and maximum permissible parking times;
    (c) calculating a charge for a maximum permissible parking time corresponding to the time of day and date;
    (d) comparing said calculated charge with said discrete monetary value from said user's account card;
    (e) starting the measurement of said maximum time if said charge is less than said monetary value, or calculating the time period corresponding to said monetary value if said charge is greater than said monetary value and then commencing measurement of said calculated time period;
    (f) forwarding said charge or said monetary value, whichever is the smaller, to said means for amending said read/write memory for deduction from said discrete monetary value;
    (g) forwarding a meter identification code to said means for amending said read/write memory for recordal on said user's card;
    (h) calculating a refund amount if a user's card bearing said recorded meter identification code is read by said reading means prior to expiry of said maximum or corresponding parking time period;
    (i) ending the measurement of time started in (e) following step (h);
    (j) conveying said refund amount to said means for amending said read/write memory to record on said user's card as a credit; and
    (k) sending a signal to said indicator at an end of said maximum or calculated time measured in step (e) or after step (i), whichever is the sooner, in order to operate said indicator to indicate the termination of said parking period.

2. A parking meter according to claim 1 wherein said programmable means is a microprocessor.

3. A parking meter according to claim 2 wherein said microprocessor has at least 4K of available memory.

4. A parking meter according to claim 1 including a visible display for indicating the elapse of said maximum or calculated time period.

5. A parking meter according to claim 1, wherein said means for reading said read/write memory and said means for amending said read/write memory incorporates a magnetic recording head and means for conveying a magnetic strip on said user's account card past said magnetic recording head.

6. A parking meter according to claim 1, wherein said programmable means is remote from said body but is connectable thereto by a data-carrying link.

7. A group of parking meters comprising two or more parking meters according to claim 1 wherein the programmable means of each unit is formed by a single programmable means remote from said meter bodies but connectable thereto by data-carrying links.

* * * * *